Figure 1:
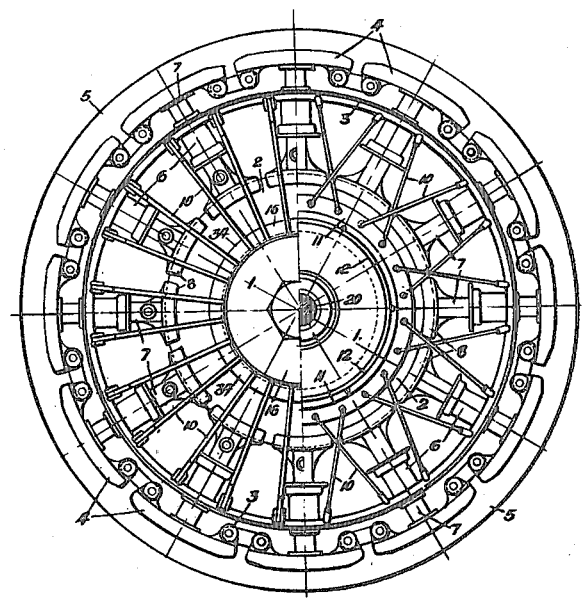

A. T. SMITH.
VEHICLE WHEEL.
APPLICATION FILED FEB. 28, 1914.

1,166,268.

Patented Dec. 28, 1915.
3 SHEETS—SHEET 1.

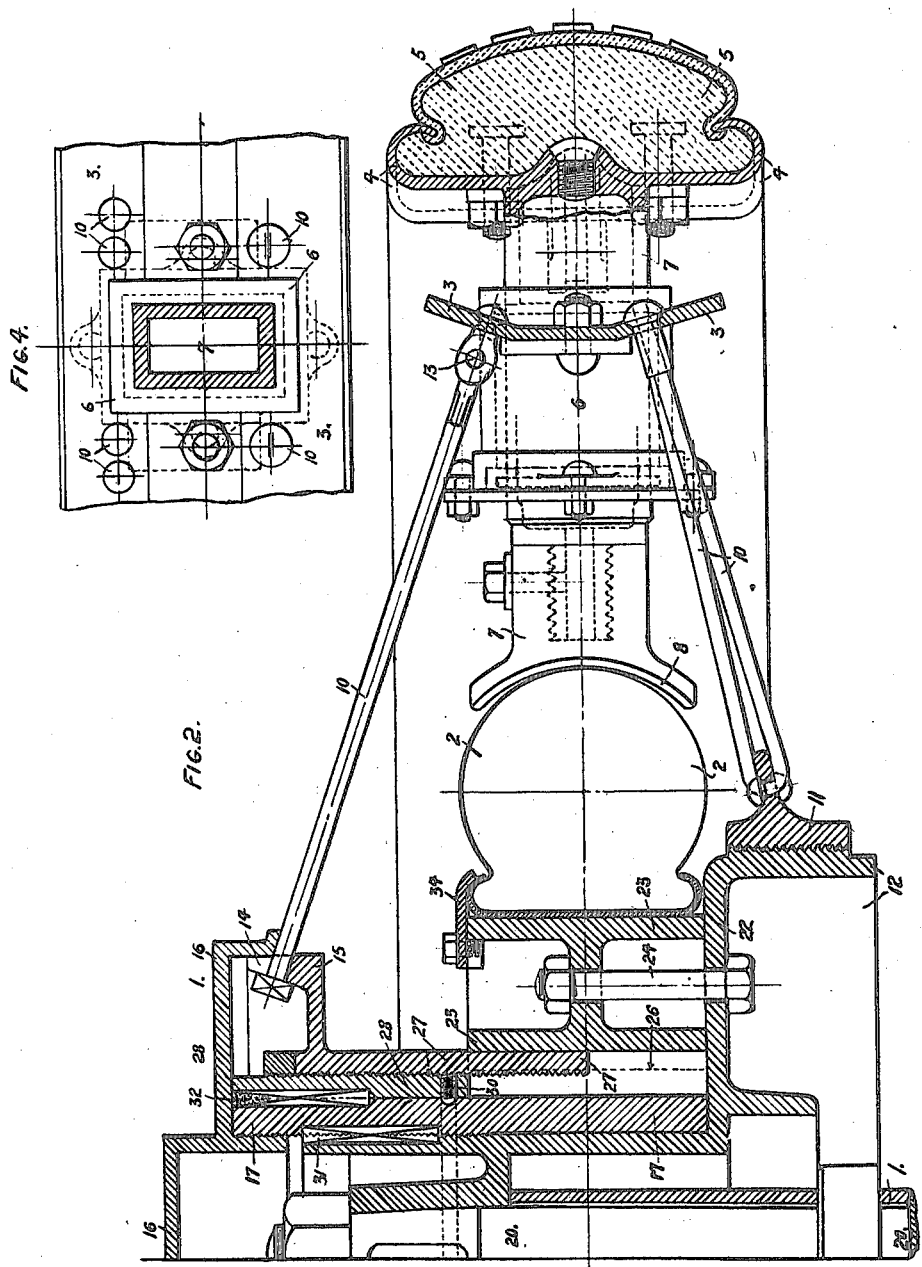

A. T. SMITH.
VEHICLE WHEEL.
APPLICATION FILED FEB. 28, 1914.
1,166,268.
Patented Dec. 28, 1915.
3 SHEETS—SHEET 3.
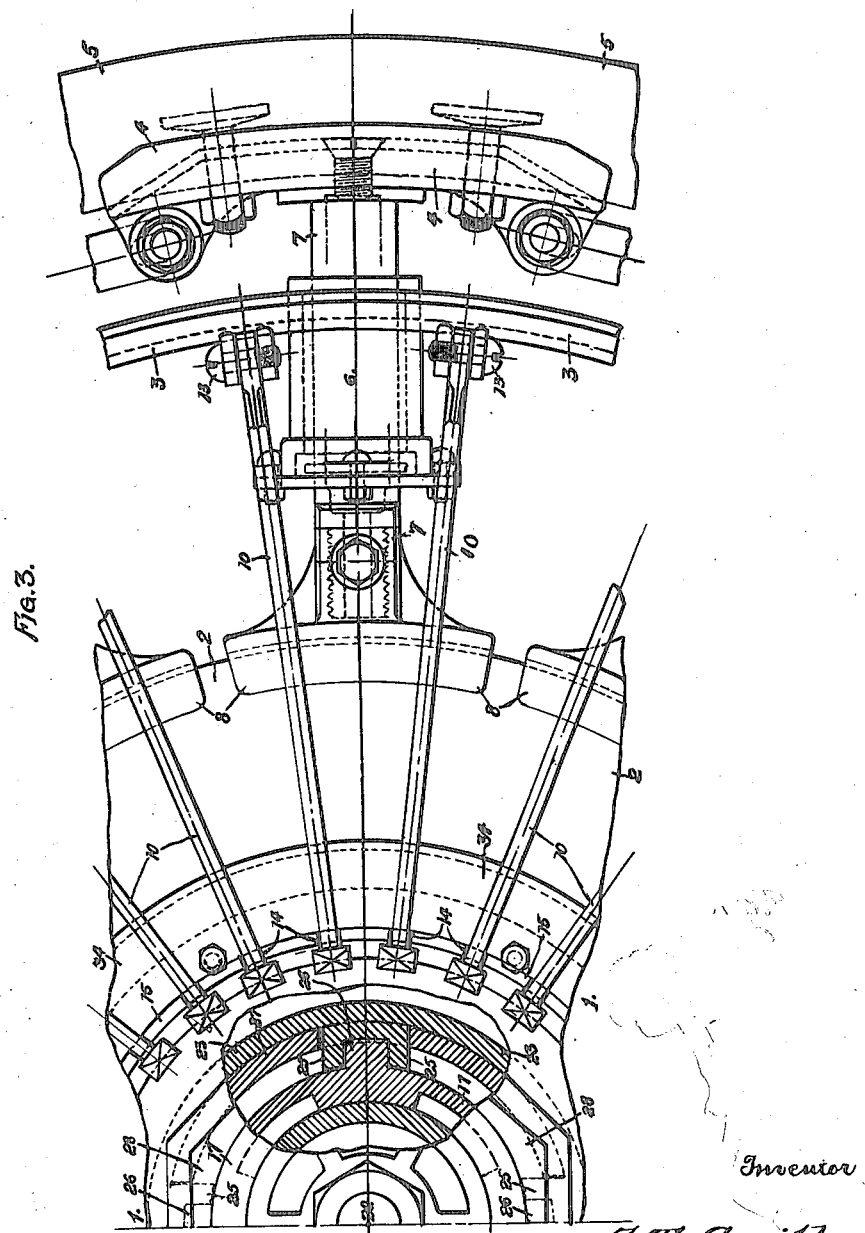

UNITED STATES PATENT OFFICE.

ALGERNON THORNTON SMITH, OF BIRKDALE, ENGLAND.

VEHICLE-WHEEL.

1,166,268.   Specification of Letters Patent.   Patented Dec. 28, 1915.

Application filed February 28, 1914. Serial No. 821,692.

*To all whom it may concern:*

Be it known that I, ALGERNON THORNTON SMITH, a subject of the King of England, residing at Birkdale, in the county of Lancaster, England, have invented certain new and useful Improvements in or Connected with Vehicle-Wheels, of which the following is a specification.

This invention has reference to vehicle wheels, and more particularly those of self-propelled vehicles employed on common roads and streets.

In wheels of the character herein concerned, in which between an outer tread and the hub there is a pneumatic or equivalent elastic cushion, and the outer tread acts upon this cushion through spokes having radial movement through guides or supports in a circle, outside the said pneumatic or elastic member, the guides or supports in the present wheel are carried in a ring plate or rim, and consist of tubes, say of rectangular form, with ball or roller bearings inside them, and of some considerable depth or length; and this ring plate or rim is connected with and supported by tension spokes, which are connected to rings on the hub, whereby they may be adjusted or moved collectively; and the parts are so constructed and arranged that they can be easily removed or put in place, so that the space within the spokes, and containing the pneumatic or elastic medium, can be got at for repair, or placing in position, renewal or other purposes.

The inner ends of the tensioned spokes on one side of the wheel, fit into gaps or slots in the flanges of the ring which fits over the boss of the hub at the outer end; and the ring is adapted to be moved in the direction of the axis of the hub, that is, moved to and away from the general plane of the wheel, so that the spokes may be slackened and tightened and fixed, as and how desired.

The invention is illustrated in the accompanying drawings, and its description will be further made with reference to them.

In the drawings, Figure 1 is a side elevation of a wheel comprising the improvements hereunder, one half showing the outside view of the wheel, and the other the inside view of it. Fig. 2 is a cross section of a part of the wheel to an enlarged scale; and Fig. 3 is an outside elevation partly in section, showing one of the guide and slide parts; while Fig. 4 is a cross section of the guides and slides.

Referring to the drawings, 1 represents generally, the hub of the wheel; 2 is a pneumatic or equivalent elastic cushion supported on same; 3 is the inner rim; 4 the outer ring of saddles, and 5 the outer tire proper which rests and is supported by the saddles, and works in connection with the surface of the road.

6 are the guides fixed and carried in the inner rim 3, through which work the tubular spokes or slides 7; one of which is fixed on the inside of each of the outer saddles 4, and has at its inner end a shoe 8, which rests on the outside of the pneumatic or other elastic cushion 2. The guides or supports 6 are preferably of rectangular form as shown with ball or roller bearings inside them.

The rim 3 is connected and supported from the hub 1 by the wire spokes 10, one set at one side, that is the inner side, being attached to a ring 11, screwing on to, and fixed to the outer flange 12 of the inner part of the hub 1; while the spokes 10 on the outside of the wheel are connected at their outer ends to the ring plate or rim 3 by pin joints at 13. These latter spokes fit in gaps 14 formed in the flange of the outer ring 15 of the hub; the inner surfaces on which the ends or heads of the spokes 10 rest being inclined, and at right angles to the axes of the spokes. The spokes 10 are held in position in the ring 15 by the outer cap ring 16, which screws into the inner part 17, fixed on the hub.

With regard to the form and construction of the guides 6, spokes or slides 7, the saddles 4 and the outer tire 5, these form no part of the present invention, being covered under my prior application Serial No. 819,794, filed February 19, 1914. The saddles 4 to which each spoke 7 is attached are inter-connected, as shown in the drawing, Fig. 1, similarly as in the wheel set forth in my said former application.

The inner hub comprises a portion 17 fitted on the outer end of the axle 20 and also a sleeve 17' on the inner end of which is a rib 22. Extending inwardly from the periphery of this flange is a rib 12, threaded on the exterior. The outer end of the sleeve 17 is threaded and on the threaded portion is screwed a sleeve 17ᵃ on the outer end of which is fixed a sleeve 28 whereon is screwed a sleeve 27. On the member 17 are certain longitudinal ribs 26 which are disposed opposite suitable slots in the sleeve 27 so that grooved ribs 25 formed within the outer hub B may pass through these slots and engage said ribs 26. The outer hub B is H-shaped in cross section and comprises inner and outer flanges 23 and an annular connecting web 23'. Through this web and the flange 22 pass securing bolts 24. On the sleeve 27 at its outer end is an annular flange 15 provided with spaced slots 14 wherein fit the outer spokes 10, said spokes being retained in the slots by a flange 16' formed on a cap 16. This cap 16 is secured as at 16ᵃ to the sleeve 17ᵃ.

The ring or sleeve 28 is adapted to be revolved by a spanner or the like, fitted over or into its end; and it is prevented from moving longitudinally by a screw pin 30 in it, and the end of which works in a groove on the outside of the sleeve 17. The sleeve 17 is prevented from revolving on the inner portion of the hub by a key 31; and normally the sleeve 28 is prevented from being revolved on the sleeve 17 by a key 32, which is capable of being inserted and withdrawn in any known suitable way. But when this key is removed, the sleeve 28 can be revolved, and thereby the sleeve 27 will be moved to and fro inside the inner ring 23, so that the spokes can be made slack, and tightened up, at will, when and as desired; it being, of course understood when this is done that the cap 16 is removed from the hub. The cushion or tire 2 is kept in place on the outer ring 23 by a removable flange 34.

It will be seen by this construction therefore, that by removing the cap 16, and operating the sleeve 28 in the manner described, the spokes 10 can be slackened and freed and when moved about their pin hinges 13, the cushion or tire 2 can be got at, and it can with the rim in which it fits, be slid on to, or taken off the ring 23 for any purpose.

What is claimed is:—

1. In a vehicle wheel, a hub comprising a main portion and a portion movable longitudinally of and revoluble with the main portion, said hub further including means for adjusting the movable portion on the fixed portion, said fixed portion being provided with a slotted flange, a rim, and a set of spokes connecting said rim and hub, said spokes having hinge connections to the rim and fitting said slots.

2. In a vehicle wheel, a hub comprising a main portion and a portion movable longitudinally of and revoluble with the main portion, said hub further including means for adjusting the movable portion on the fixed portion, said fixed portion being provided with a slotted flange, a rim, a set of spokes connecting said rim and hub, said spokes having hinge connections to the rim and fitting said slots, and a hub detachably connected to said hub and having a flange bearing against the spokes when said spokes are in said slots.

In testimony whereof I have signed my name to this specification in the presence of two subscribing witnesses.

ALGERNON THORNTON SMITH.

Witnesses:
  SOMERVILLE GOODALL,
  WILLIAM J. HUMPHREYS.